Jan. 21, 1936.    W. L. WRIGHT    2,028,484
MOTION PICTURE PROJECTOR
Filed Nov. 20, 1933    3 Sheets-Sheet 2
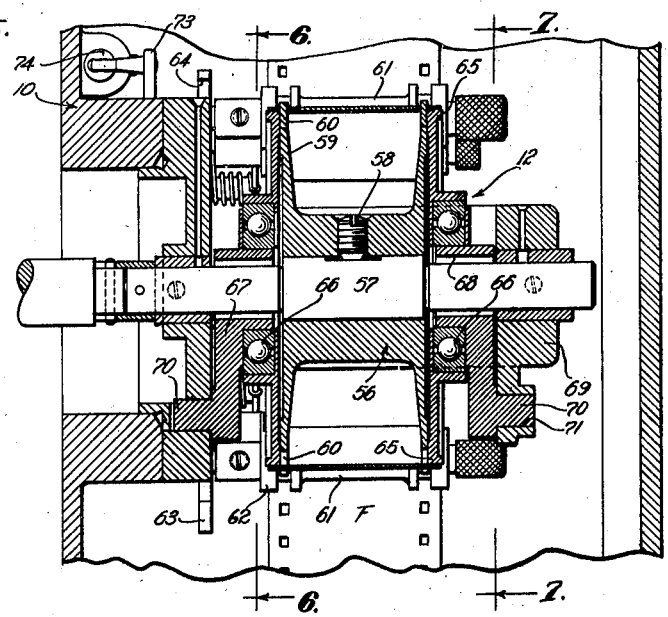
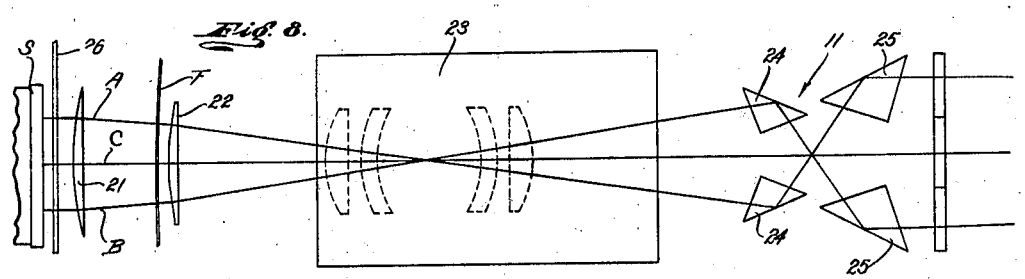
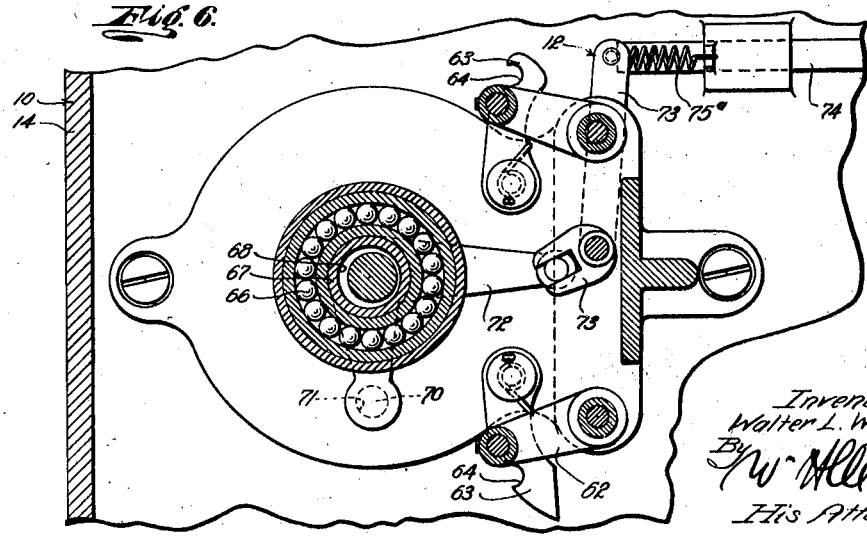
Inventor
Walter L. Wright
By
His Attorney Jan. 21, 1936.   W. L. WRIGHT   2,028,484
MOTION PICTURE PROJECTOR
Filed Nov. 20, 1933   3 Sheets-Sheet 3
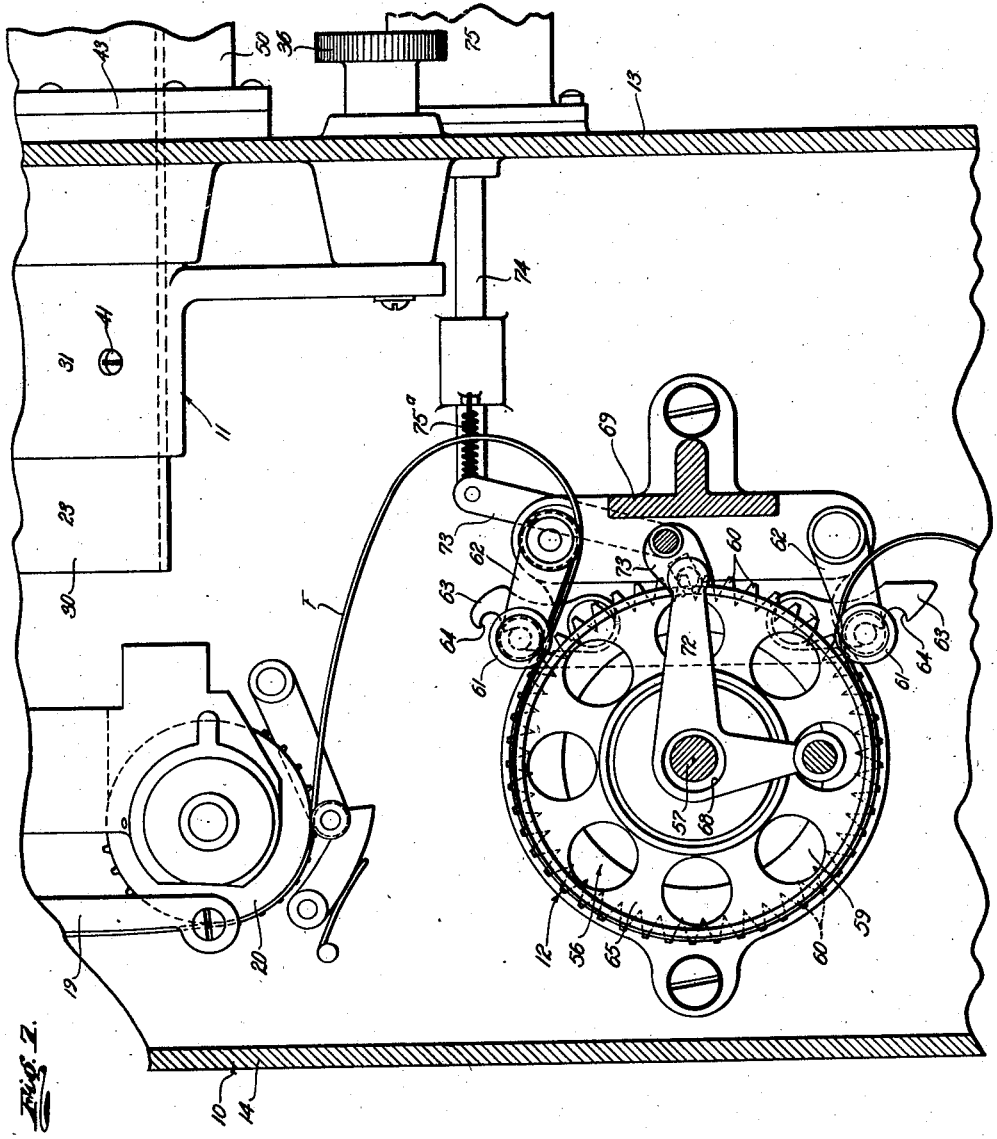

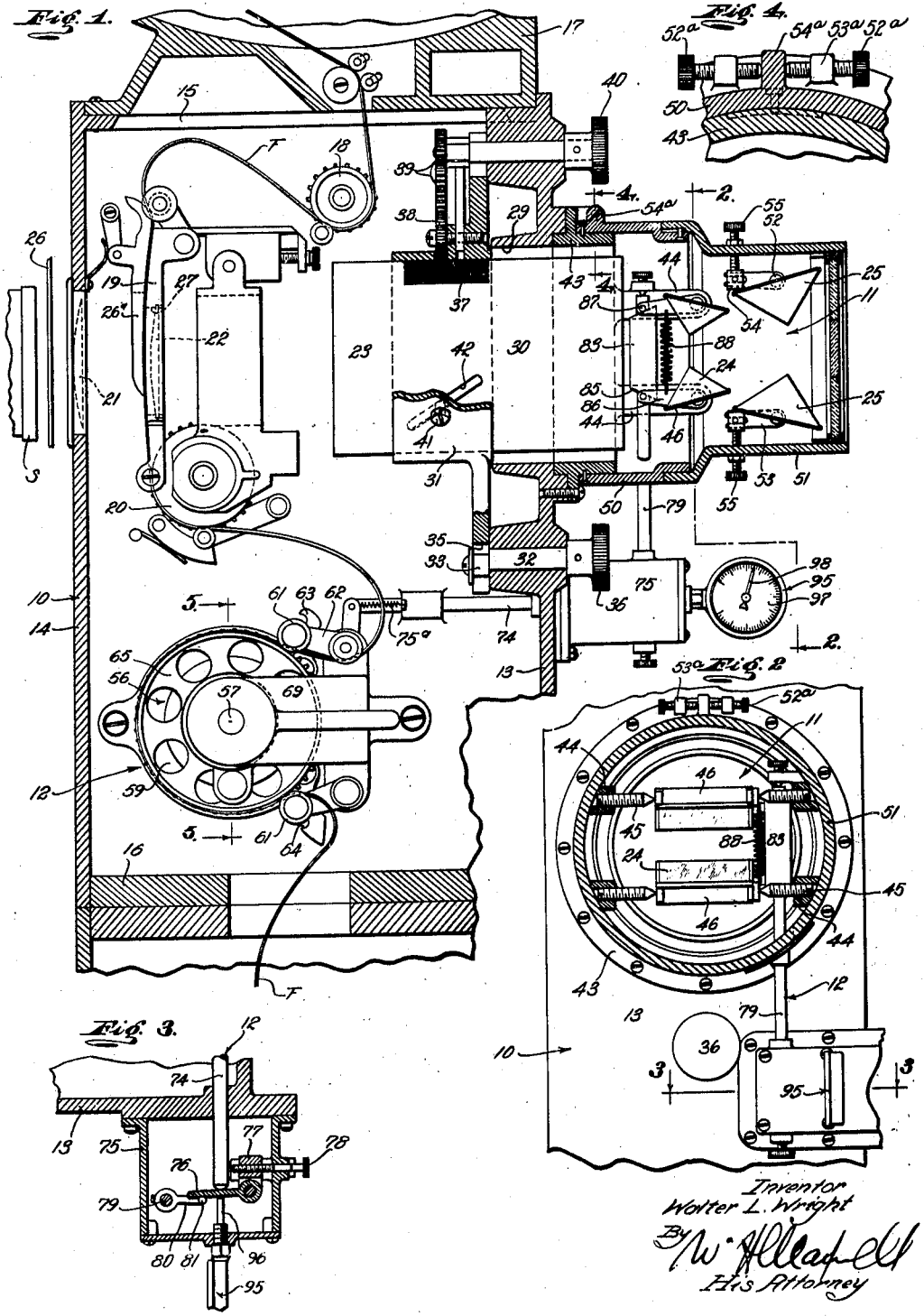

Patented Jan. 21, 1936

2,028,484

UNITED STATES PATENT OFFICE 2,028,484

MOTION PICTURE PROJECTOR

Walter L. Wright, Santa Monica, Calif., assignor to Synchrome Corporation, Santa Monica, Calif., a corporation of California Application November 20, 1933, Serial No. 698,762

20 Claims. (Cl. 88—16.4)

This invention relates to motion picture apparatus and relates more particularly to a motion picture projector. It is a general object of the present invention to provide a simple, practical motion picture projector for simultaneously projecting a plurality of pictures onto a screen in perfect registration.

The present invention relates primarily to a projector adapted to be employed in the methods of producing colored motion pictures involving the use of film bearing series of images of a subject, each series consisting of a plurality of images or pictures of different color values arranged longitudinally on the film. I will make particular reference to the film used in one of such methods where each series of images or pictures comprises three pictures of different color values of the subject spaced side by side longitudinally on the film and bearing definite relations to the perforations of the film, the several pictures of a series having been taken simultaneously from a single point of vision. When projecting the pictures of a film of this character, it is essential that the three pictures of a series be projected on the screen in approximately perfect registration. The material of which motion picture film is commonly formed is subject to atmospheric and temperature conditions and age so that the film often becomes shrunken. Variations in the length of the film of course, change the relative spacing of the pictures of the several series. The variations in the film often occur when a section of new film is patched into a reel of old film and when the outer wrappings of a rolled-up film are exposed to conditions that do not affect its more protected inner portions. When these variations in the film are present the pictures cannot be projected on a screen in perfect registration unless means is provided to compensate for them.

It is an object of the present invention to provide a motion picture projector for handling film bearing a plurality of a series of pictures each series comprising a plurality of pictures of different color values of a subject taken simultaneously from a single point of vision and that automatically compensates for any variations in the length of the film due to shrinkage or stretching to project the several pictures of a series on a screen in perfect registration.

It is another object of the invention to provide a motion picture projector of the character mentioned including a compensator or film engaging control device responsive to variations in the length of the film to automatically adjust or operate an element or elements of the optical system of the projector to adjust the optical system to compensate for such variations and to project the pictures in perfect registration.

It is another object of the invention to provide a motion picture projector of the character mentioned that is entirely automatic in its operation to automatically adjust or regulate the optical system as variations in the film are encountered during operation of the projector to maintain the pictures of the series in perfect registration throughout the entire run of the projector.

It is another object of the invention to provide a motion picture projector of the character mentioned that is very sensitive to automatically respond to and compensate for slight variations in the length of the film.

It is another object of the invention to provide a motion picture projector of the character mentioned that includes an improved and particularly effective optical system involving optical elements mounted so that they are extremely sensitive to or responsive to adjustment by the automatic compensating means and other adjustable optical elements capable of fine accurate manual adjustment.

It is a further object of the invention to provide a projector of the character mentioned in which the operative connection between the film responsive control or compensator and the automatically adjustable optical elements may be adjusted to provide for the proper operative relationship between the compensator and the optical elements.

It is another object of the invention to provide an optical system for a projector for handling film of the character mentioned in which the shafts of light passed by the several pictures of a series are projected from the projector in close spaced relation.

Another object of the invention is to provide an optical system for a projector handling film of the character referred to that includes an adjustable reflector means causing the light shafts passed by the end pictures of a series to cross at the axis of the optical system and pass from the projector in spaced but relatively close relation to the shaft of light from the center picture of the series.

Another object of the invention is to provide an optical system that is adjustable to provide for great variations in the length of throw or projection of the pictures whereby lenses of different focal lengths may be employed to meet the requirements of various theater conditions.

It is a further object of the invention to provide a motion picture projector of the character mentioned that is simple and inexpensive of manufacture and that is such that the elements or parts of the optical system are readily accessible for cleaning, etc.

Other objects and features of the invention will be best and fully understood from the following detailed description of typical forms and applications of the invention, throughout which description reference is had to the accompanying drawings, in which:

Fig. 1 is a vertical detailed sectional view of the principal parts of the projector provided by the present invention. Fig. 2 is a transverse detailed sectional view taken substantially as indicated by line 2—2 on Fig. 1. Fig. 3 is a fragmentary horizontal sectional view taken as indicated by line 3—3 on Fig. 2. Fig. 4 is an enlarged fragmentary vertical detailed sectional view taken as indicated by line 4—4 on Fig. 1. Fig. 5 is an enlarged vertical detailed sectional view taken substantially as indicated by line 5—5 on Fig. 1. Fig. 6 is a vertical detailed sectional view taken as indicated by line 6—6 on Fig. 5. Fig. 7 is a vertical detailed sectional view taken as indicated by line 7—7 on Fig. 5, and Fig. 8 is a diagrammatic view of the optical system included in the projector.

The present invention is adapted to be embodied in projectors for handling film bearing a plurality of series of spaced pictures each series including a plurality of pictures or images of a subject of different color values taken simultaneously from a single point of vision. The invention is particularly adapted to handle film in which each series includes three spaced pictures arranged longitudinally of the film, it being understood that the automatic control for the optical system included in the projector may be employed in connection with optical systems of various characters and in connection with projecting mechanisms for handling various classes of film.

The motion picture projector provided by the present invention includes, generally, a body structure or case 10, an optical system 11 operatable to simultaneously project three pictures on a screen in registration, and an automatic compensating means or control 12 responsive to variations in the length of the film to adjust the optical system 11 to compensate for such variations.

The body structure or case 10 may be similar to the cases or housings embodied in similar projecting devices. The particular case 10 illustrated in the drawings is a vertically disposed substantially rectangular structure having a front wall 13, a rear wall 14, and a top 15. A partition 16 is provided in the case 10 to separate its upper or major portion from the sound reproducing unit commonly employed in connection with motion picture projectors. A film magazine 17 is arranged on the top 15 to carry the film to be used in the projector. The film F passes downwardly from the magazine 17 into the interior of the case 10 and operates over a continuously rotating sprocket 18. From the sprocket 18 the film F passes through a gate 19 and is then engaged by an intermittently operated advancing sprocket 20 positioned adjacent the lower end of the gate. After leaving the intermittently rotated sprocket 20 the film F passes to the compensator or automatic control 12, as will be subsequently described.

The optical system 11 provided by the invention includes a source of light S, a condensing lens 21 between the light source S and the film gate 19, a lens or prism 22 for deflecting inwardly the light shafts passed by the end pictures of a series of pictures of the film F, a projection lens 23, and two pairs 24 and 25 of adjustable prisms for changing the direction of the end shafts after leaving the projection lens 23.

The light source S is provided at the rear of the case 10 and a shutter 26 is positioned between the light source S and the condensing lens 21. A guide or holder 26ª is operatable to hold the film F at the aperture 27 of the gate 19 to have the three pictures of a series properly aligned at the aperture. The prism 22 is positioned in the optical system between the film F and the projection lens 23. The prism 22 has two opposite end parts which bend or direct inwardly the shafts of light A and B passed by the end pictures of the series. The center shaft of light passed by the center picture of the series is projected directly through the plain central portion of the prism 22 which has parallel surfaces. The projection lens 23 is arranged on the axis of the optical system at a point in front of the prism 22 and may be a projection lens of the character employed in motion picture projectors. The prism 22 is such that the end light shafts A and B are caused to intersect the light shaft C passed by the center picture of the series at a point spaced a comparatively short distance in front of the prism 22. It is important to note that the prism 22 is positioned and related to the other elements of the optical system to cause the light shafts A and B from the end pictures to pass from the projection lens in a manner so they are definitely spaced from the central shaft C to be individually influenced by the optical elements 24 and 25.

The projection lens 23 extends through an opening 29 in the front 13 of the case. In accordance with the invention, the projection lens 23 is mounted for adjustment. The tube or housing 30 of the projection lens 23 is held by a carrier 31 supported for vertical and lateral adjustment. The adjusting means for the carrier 31 illustrated in the drawings includes an adjusting pin 32 having an eccentric 33 operating in a vertical slot 35 in the carrier 31. A knob 36 is provided on the outer end of the pin 32 to facilitate manual adjustment of the pin. It will be apparent how rotation of the pin 32 causes lateral adjustment of the projection lens 23. The means for adjusting the projection lens vertically is not illustrated in the drawings; however, it may be similar to the adjusting means just described. Means is provided for shifting or adjusting the projection lens 23 longitudinally of the axis of the optical system. Gear teeth 37 are provided on the tube 30 and a pinion 38 operatively meshes with the teeth 37. Suitable gears 39 are provided to drive the pinion 38 and may be operated by an operating knob 40. A pin 41 projects inwardly from the carrier 31 and cooperates with a pitched slot 42 in the tube 30 to cause longitudinal movement of the lens tube 30 when the tube is rotated by means of the gearing just described.

The pairs of prisms 24 and 25 are arranged in front of the projection lens 23 to reflect the light shafts A and B from the end pictures to bring them in their proper relation and registration on the screen. The prisms 24 and 25 are in the nature of reflecting means which reflect the end light shafts A and B to cross or intersect one another and then pass forwardly in close relation to the central light shaft C. In accordance with the broader aspects of the invention either one of the pairs of reflecting elements 24 or 25 may be controlled by the automatic control 12. In the case illustrated the pair of prisms 24 is under the control of or is adjusted by the control means 12, while the prisms 25 are adapted to be manually set or adjusted. The pair of inner prisms 24 are automatically and simultaneously adjusted by the control means 12 while the pair of outer prisms 25 may be adjusted as a unit relative to the pair of inner prisms and may be independently adjustable relative to one another.

A ring or annular mounting 43 surrounds the opening 29 in the front of the case 10 and projects forwardly from the case. A pair of spaced arms 44 projects forwardly from the mounting 43 at opposite sides of the axis of the optical system 11 to support the inner prisms 24. Screws 45 are threaded inwardly through openings in the opposing arms 44 and are provided with pointed inner ends. The prisms 24 may be held by plates 46 and the pointed inner ends of the pins 45 may cooperate with parts on the plates to support the prisms 44 for free pivotal movement. It is a feature of the invention that the pivotal axes of the prisms 24 are equally spaced between the longitudinal edges of the reflecting surface of the prisms so that pivotal movement of the prisms results in a maximum change or alteration of the positions of the reflecting surface. The prisms 24 are spaced at opposite sides of the axis of the optical system 11 and are positioned to reflect the end shafts of light A and B from the end portions of the series inwardly and forwardly to intersect at or adjacent the axis of the system.

The outer reflectors or prisms 25 of the optical system 11 are spaced forwardly and slightly outwardly from the inner prisms 24. A tubular housing is provided to carry the outer prisms 25 and to enclose or house both the prisms 24 and 25. The housing may be sectional including an inner section 50 and an outer section 51. The inner section 50 telescopes over the projecting end portion of the mounting 43. In accordance with the invention, the housing is adjustable around the longitudinal axis of the optical system 11, that is, it may be partially turned or slightly rotated. The inner section 50 of the housing is rotatable on the flange 43 and opposing screws 52ª are threaded through spaced lugs 53ª on the mounting to cooperate with a lug 54ª on the housing section 50 to provide for the rotary adjustment of the housing and to set or lock the housing in its adjusted position. The outer section 51 of the prism housing telescopes over or fits on the reduced outer end of the inner section 50. Pins 52 project from the interior of the housing section 51 to pivotally support the prisms 25. The prisms 25 are preferably mounted so that their axes of pivotal movement are equally spaced between and are parallel to the opposite longitudinal edges of their reflecting surfaces. Lateral projecting arms 53 are provided on the prism carrying pins 52. The ends of the arms 53 are yoked and are operatively engaged by nuts 54 on adjusting screws 55. The screws 55 are threaded through the wall of the housing section 51 so that their outer ends are readily accessible. It will be apparent how the outer prisms 25 may be pivoted or adjusted relative to one another and relative to the inner prisms 24 and how the pair of prisms 25 may be adjusted as a unit relative to the other parts of the optical system to adjust the system to provide for the proper projection of the three pictures of the series of the film and thus initially set or adjust the projector to handle typical or average film or to handle any specific type or run of film.

The automatic compensating means or control means is responsive to variations in length of the film to adjust the inner prisms 24 and thus regulate the optical system 11 to compensate for such variations in the film. The compensator or control means 12 includes a continuously rotating sprocket 56 for engaging the film F. The sprocket 56 is illustrated as spaced below the intermittently operated feed sprocket 20. A shaft 57 which is suitably connected with the operating mechanism of the projector is provided to carry the sprocket 56. The shaft 57 is continuously rotated and is properly synchronized with the shafts of the other film feeding sprockets. The sprocket 56 is keyed to the shaft by a pin 58 and has two spaced end plates 59. Teeth 60 are provided on the peripheries of the end plates 59 to cooperate with the perforations in the longitudinal edge portions of the film. The teeth 60, in cooperating with the perforations in the film, operate to cause the continuous movement of the film. In accordance with the invention, the teeth 60 are comparatively long or deep to allow for considerable tightening and axial loosening of the film on the sprocket. The end faces or sides of the teeth 60 are preferably outwardly convergent as illustrated in the drawings to permit the free tightening and axial loosening of the portion of the film that is passing around the sprocket 56.

Means is provided for holding the film F in engagement with the sprocket 56 at points spaced substantial distances around the sprocket. Rollers 61 are provided to engage the film F to hold the film in cooperation with the sprocket 56 at the point it passes onto the sprocket and the point at which it passes from the sprocket. In the particular arrangement illustrated in the drawings, the rollers 61 are spaced considerably more than 180° around the sprocket 56. It is preferred to thread the film through the apparatus so that a substantial loop or loose portion of film is left between the intermittently rotating sprocket 20 and the sprocket 56 so that the portion of the film passing around the sprocket 56 has no intermittent or irregular movement. Pivoted arms 62 carry the film engaging rollers 61, and the rollers are urged inwardly against the film by spring pressed catches 63. The catches 63 are such that the rollers 61 may be swung outwardly to engage in outer notches 64 in the latches when the film is to be threaded around the sprocket 56.

In accordance with the invention, the control means 12 engages and measures or is responsive to the length of the portion of film engaging around the sprocket 56 and adjusts the prisms 24 in accordance with the length of the portion of the film and therefore adjusts the prisms in accordance with the spacings of the pictures of the several series. The automatic control means 12 includes plates or shoes 65 for engaging the film F at the outer sides of the sprocket plates 59. The shoes 65 have cylindrical peripheries for engaging the opposite longitudinal edge portions of the film F. Spaced bearings 66 carry the film engaging shoes 65 for free rotation. The bearings 66 surround hub members 67 positioned at opposite sides of the sprocket 56. The members 67 have openings 68 passing the sprocket shaft 57 with considerable clearance. The members 67 are supported for pivotal movement in unison and their pivotal axis is spaced from the axis of rotation of the sprocket 56. Yokes or arms 69 project from a stationary part of the case 10 at the opposite ends of the sprocket. The sub members 67 have crank arms or pins 70 rotatable in openings 71 in the arms 69. The axes of the pins 70 are longitudinally aligned and are spaced from and parallel with the axis of the sprocket shaft 57. A lever arm 72 projects from one of the hub members 67 and is operatively connected with the prisms 24.

The operative connection between the shoes 65 and the inner prisms 24 includes a bell crank or lever 73 having a short arm pivotally connected with the arm 72 and a longer upwardly projecting arm. A horizontal longitudinally movable rod 74 has operative engagement with the long arm of the lever 73. A spring 75ª acts on the rod 74 and lever 73 to yieldingly urge the shoes 65 against the film F and to pivot or move the shoes outwardly when an elongated or stretched portion of film is passing over the sprocket 56. It is a feature of the invention that the operative connection between the film engaging shoes 65 and the prisms 24 is adjustable to provide for the proper relation between the movement of the shoes and the movement of the prisms. The rod 74 extends into a box or housing 75 at the front of the case 10. A multiplier or lever 76 is mounted in the housing 75 for converting longitudinal movement to pivotal or rotary movement. The lever 76 is pivotally connected to a block 77 and a screw 78 passes into the housing 75 to adjust the block and lever 76 longitudinally. The end of the rod 74 engages the lever 76 at a point between the ends of the lever. A shaft 79 extends vertically upward from the housing 75 to the section 50 of the prism housing. An arm 80 is provided on the lower end of the shaft 79 within the housing 75 and carries a pin 81 which is engaged by the lever 76. The lever 76 is adapted to transmit movement from the longitudinally shiftable rod 74 to the shaft 79 and may be adjusted longitudinally by means of the screw 78 to change the ratio of movement of the rod and shaft, whereby the optical system may be accurately controlled or adjusted to adapt the projector for the handling of film of various characters.

The shaft 79 extends upwardly into the inner section 50 of the lens housing and its upper end carries a cam 83. Inclined or pitched faces 85 are provided on the opposite ends of the cam 83. Levers or arms 86 project rearwardly from the plates 46 carrying the prisms 24. Pins 87 project from the arms 86 and cooperate with the active faces 85 of the cam 83. Spring means is provided to maintain the pins 87 in cooperation with the cam faces 85 and to pivot the prisms 24 in a direction to compensate for a reduced spacing of the pictures on the film when the shoes 65 are moved inwardly when a short or shrunken portion of the film passing over the sprocket 56. A spring 88 connects the arms 86 to hold the pins 87 in cooperation with the cam faces and to automatically pivot the prisms 24 when the cam 83 is turned in a direction to allow such pivoting.

The invention may include means for visibly indicating the extent of the variations of the film F. An indicating device 95 in the form of a gage is mounted on the housing 75. The actuating part or plunger 96 of the indicating device 95 projects into the housing 75 and engages the lever 76. The dial or face 97 of the device 95 is calibrated in terms of linear units of film to be read in conjunction with a movable hand 98 properly shifted through cooperation of the plunger 95 with the lever 76 to indicate the extent of elongation or shrinkage of the film.

It is believed that the operation of the improved projector provided by the present invention will be readily understood from the foregoing detailed description. The shoes 65 are normally yieldingly urged outwardly against the film F by the spring 75ª so that the portion of the film passing around the sprocket 65 is under tension. The teeth 60 of the sprocket 56 cooperate with the perforations in the film at points adjacent the rollers 61 so that the film is advanced or maintained in operative engagement with the sprocket at all times regardless of the position of the remainder of the portion of film passing around the sprocket. The shoes 65 in continuously engaging the film under the pressure or action of the spring 75ª measure the portion of film passing around the sprocket 65, that is, they shift when this portion of the film varies in length. The spacing of the perforations of the film is very accurate and the pictures are made on the film in a definite relationship with the perforations which relationship remains even where variations in the film have occurred. The perforations therefore form accurate means for gauging the length of the film. Assuming that the portion of the film engaging around the sprocket 56 is longer than the preceding parts of the film, the spring 75 causes the shoes 65 to be pivoted outwardly and be maintained in yielding engagement with the film. This movement of the shoes 65 results in pivoting of the arm 72 and lever 73 and longitudinal movement of the rod 74. This longitudinal movement of the rod 74 causes the lever 76 to be pivoted or swung resulting in partial rotation of the shaft 79. This rotation of the shaft 79 causes the cam faces 85 to retract from the pins 87 so that the spring 88 pivots the prisms 24. In this manner the elongation or stretching of the film is automatically compensated for by shifting of the optical elements 24. When the shrunken or short portion of film engages around the sprocket 56, the shaft 79 is of course turned into the opposite direction causing swinging apart of the arms 86 and pivoting of the prisms 24 in the corresponding direction. In this manner the automatic control means 12 is operatable to automatically adjust or control the prisms 24 to regulate the optical system to project the three pictures of the series on the screen in perfect registration at all times.

The means 12 is very sensitive to impart slight accurate adjustment to the prisms 24 when slight variations in the film are present. The lever 76 is adapted to be shifted or adjusted to provide for the proper relationship between the movement of the shoes 65 and the pivoting of the prisms 24. The adjustment of the prisms 24 is entirely automatic and is continuous throughout the operation of the projection, that is, the prisms are at all times under the direct control of the means 12. The outer prisms 24 may be accurately set or adjusted as found necessary, it being noted that the prisms 25 may be pivoted independently and may be turned about the axis of the optical system 11 to move the images of the end shafts of light A and B in opposite directions and align them with the center shaft C.

From the above it is believed that the operation of the mechanism will be clearly understood, it being apparent that elongation or stretching of the film results in proportionate increase in the spacing of the pictures of the series of pictures on the film and that a shrinking of the film causes a proportionate lessening of the spacing of the pictures of the series. The automatic control 12, in being responsive to variations in the length of a typical portion of the film adjacent the gate 19, is operatable to directly and accurately regulate or adjust the prisms 24 to alter the operation of the optical system and thus compensate for such variations in the film. The optical system of the present invention is particularly effective and is well adapted for use with automatic control. The prism 22 causes the shafts of light A and B from the end pictures to pass to the reflecting elements 24 and 25 in spaced relation to the central shaft C so that there is no intermingling of the light. Further the definite spacing of the end light shafts A and B from the central light shaft C as they pass from the projection lens allows them to be acted upon or influenced by the prisms 24 and 25 entirely independent of the central light shaft. The reflecting elements or prisms 24 reflect the end shafts A and B inwardly to intersect at or adjacent the axis of the optical system while the outer prisms 24 reflect the light shafts A and B forwardly in the proper slight convergence to fall in register on the screen with the central light shaft. It is to be noted that the end light shafts A and B pass from the prisms 24 in relatively close relation to the central light shaft A so there is a minimum amount of parallax.

Having described only a typical form and application of my invention, I do not wish to be limited or restricted to the typical form or application herein set forth, but wish to reserve to myself any modifications or variations that may appear to those skilled in the art or fall within the scope of the following claims.

Having described my invention, I claim:

1. In a projector for handling film having longitudinally spaced perforations and bearing a plurality of series of pictures each series comprising a plurality of pictures arranged longitudinally on the film, means for constantly moving the film including moving parts cooperating with perforations spaced a substantial distance along the film, an optical system for projecting shafts of light through the pictures of each of the series to fall on a screen in register, the system including means for projecting light shafts through the pictures of a series, pivotally mounted elements for reflecting the shafts from the end pictures to cross, elements spaced forwardly from the first-named elements to reflect the said shafts to fall in register with the shaft from the center picture, a member bearing on the portion of film between said parts to move in response to variations in the length of the said portion, and a connection between the member and certain of said elements whereby the said elements are pivoted to compensate for such variations.

2. In a projector for handling film bearing a plurality of series of pictures each series comprising a plurality of pictures arranged longitudinally of the film, film feeding means, an optical system for projecting shafts of light through the pictures of each of the series to fall on a screen in register, the system including means for projecting light shafts through the pictures of a series, pivotally mounted prisms for reflecting the shafts from the end pictures to cross, prisms spaced forwardly from the first-named prisms to reflect the said shafts to fall in register with the shaft from the center picture, means carrying the last named prisms for rotative adjustment about the axis of the system, and an automatic control responsive to variations in the length of a portion of film bearing a definite number of pictures to pivot the first-named prisms to compensate for such variations.

3. In a projector for handling film bearing a plurality of series of pictures each series comprising a plurality of pictures arranged longitudinally of the film, film feeding means, an optical system for projecting shafts of light through the pictures of each of the series to fall on a screen in register, the system including means for projecting light shafts through the pictures of a series, a pair of shiftable prisms for reflecting the shafts from the end pictures to cross, a pair of shiftable prisms spaced forwardly from the first-named prisms to reflect the said shafts to fall in register with the shaft from the center picture, means for manually adjusting the last-named prisms relative to one another, and an automatic control responsive to variations in the length of a portion of film bearing a definite number of pictures to pivot one of said pairs of prisms to compensate for such variations.

4. In a projector for projecting a series of pictures arranged longitudinally of a film, film feeding means, an optical system for simultaneously projecting a plurality of shafts of light through the pictures of said series to fall in register on a screen, said optical system including, pivotally mounted optical elements for acting on the shafts passed by the end pictures of the series, and means for adjusting said elements to compensate for variations in the longitudinal disposition of the pictures on the film, said means including a continuously rotating member engaging the film, means maintaining the film in cooperation with the member at spaced points, a spring urged shiftable shoe engaging the film between said points, and an operative connection between the shoe and optical elements.

5. In a projector for projecting a series of pictures arranged longitudinally on a film, an optical system including a light source passing light through the pictures, a projection lens, prisms deflecting the light shafts from the end pictures to intersect in the projection lens, spaced elements reflecting the light shafts from the end pictures after their passage through the projection lens to intersect at the axis of the system, reflecting elements to reflect said light shafts to fall in register with the center light shaft on a screen, and means for adjusting the last-mentioned elements.

6. In a projector for projecting a series of pictures arranged longitudinally on a film, an optical system including a light source passing light through the pictures, a projection lens, means between the projection lens and film for deflecting the light shafts from the end pictures of said series inwardly to intersect the shaft of light passed by the center picture of said series, reflecting elements in front of the projection lens reflecting said light shafts to intersect adjacent the axis of the system, means for adjusting said reflecting elements, and reflecting elements spaced forwardly from the first mentioned elements to reflect said light shafts to fall on a screen in register with the light shaft from the center picture.

7. In a projector for projecting a series of pictures arranged longitudinally on a film, an optical system including a light source passing light through the pictures, a projection lens, means between the projection lens and film for deflecting the light shafts from the end pictures of said series inwardly to intersect the shaft of light passed by the center picture of said series, reflecting elements in front of the projection lens reflecting said light shafts to intersect adjacent the axis of the system, means for adjusting the reflecting elements, reflecting elements spaced from the first mentioned elements to reflect said shafts to fall on a screen in register with the light shaft from the center picture, the last mentioned reflecting elements being adjustable, and means for adjusting the last mentioned elements.

8. In motion picture apparatus, film feeding means, an optical system including a shiftable light directing element, and means operated by variation in the length of the film being handled by the feed means for shifting said element, said means including a movable member engaging a continuously moving part of the film to move in variations to its length, and an operating connection between said member and the shiftable element.

9. In a projector for projecting a series of pictures arranged longitudinaly of a photographic film, film-feeding means including means maintaining a variable deviated portion in the film, an optical system including means for simultaneously projecting a plurality of shafts of light through the pictures of said series, and a plurality of optical elements operable to direct the images of said shafts to fall in register on a screen, one of said optical elements for directing one of the light shafts being shiftable to direct the image of said shaft to register with the images of the other shafts when there are variations in the length of the film, and a member operatively connected with the said element engaging the said portion of the film to move in response to variations in the length of said portion of the film.

10. In a projector for projecting a series of pictures arranged longitudinally of a photographic film having longitudinally spaced perforations, film-feeding means including spaced parts cooperating with the perforations to maintain a deviated portion in the film, an optical system including means for simultaneously projecting a plurality of shafts of light through the pictures of said series, and a plurality of optical elements operable to direct the images of said shafts to fall in register on a screen, one of said optical elements being shiftable to direct the image of one of the shafts to register with the image of one of the other shafts when there are variations in the length of the film, and an automatic control for shifting said element to compensate for variations in the longitudinal disposition of the pictures on the film, the control including a member connected with said element to shift the same and engaging said portion of the film to move in response to variations in its length.

11. In a projector for projecting a series of pictures arranged longitudinally of a photographic film, film-feeding means maintaining a variable deviated portion in the moving film, an optical system including means for simultaneously projecting a plurality of shafts of light through the pictures of said series and a plurality of shiftably mounted optical elements for directing the light shafts to come into register on a screen, and an automatic control operatable to shift said elements to compensate for variations in the longitudinal disposition of the pictures on the film, said control including a shiftable member engaging the face of said portion of the film to move when it varies in length, and an operative connection between the member and the said optical elements.

12. In a projector for projecting a series of pictures arranged longitudinally of a film having longitudinally spaced perforations, film-feeding means including a rotating sprocket having teeth for cooperating with said perforations, and means holding longitudinally spaced parts of the film in cooperation with the sprocket, an optical system including means for projecting a plurality of shafts of light through the pictures of said series and a plurality of shiftable optical elements for directing said light shafts to register on a screen, and a movable member operatively associated with the optical elements engaging the portion of the film operating between said spaced parts to simultaneously shift said elements in response to variations in the length of said portion of the film.

13. In a projector for projecting a series of pictures arranged longitudinally of a film, having longitudinally spaced perforations, film-feeding means including moving parts cooperating with the perforations at longitudinally spaced points along the film to maintain a deviated portion in the film, an optical system including means for projecting a plurality of shafts of light through the pictures of said series and two optical elements for directing the shafts of light from spaced pictures to register on a screen, means mounting said elements for movement relative to one another whereby they may be moved to maintain such registration when there are variations in the length of the film, and means responsive to variations in the length of the said portion of film to simultaneously shift said elements to compensate for said variations.

14. In a projector for projecting a series of pictures arranged longitudinally of a film having longitudinally spaced perforations, film-feeding means including moving parts cooperating with the perforations at longitudinally spaced points along the film to maintain a deviated portion in the film, an optical system including means for simultaneously projecting a plurality of shafts of light through the pictures of said series, and two optical elements for directing separate shafts of light to register on a screen, and means mounting said elements for movement relative to one another whereby they may be moved to maintain such registration when there are variations in the length of the film, and means responsive to variations in the length of the portion of film to simultaneously shift said elements to compensate for said variations, the last-mentioned means including a shiftable member yieldingly urged against the said portion of film and an operative connection between the said member and the optical elements.

15. In a projector for projecting a series of pictures arranged longitudinally of a photographic film, film-feeding means, an optical system including means for simultaneously projecting a plurality of shafts of light through the pictures of said series and two optical elements for acting on separate light shafts from separate pictures to direct them to register on a screen, means mounting said elements for movement relative to one another, two manually adjustable optical elements for acting on the same respective light shafts, and means engaging a portion of the film bearing a definite number of pictures to be responsive to variations in the length of the same and simultaneously shift the first-mentioned optical elements to compensate for such variations and maintain the registration of the light shafts.

16. In a projector for projecting a series of pictures arranged longitudinally of a film having longitudinally spaced perforations, film-feeding means including moving parts cooperating with the perforations at points spaced longitudinally along the film, an optical system including means for simultaneously projecting a plurality of shafts of light through the pictures of said series, and a plurality of optical elements directing the light shafts to fall in register on a screen, one of the optical elements for acting on one of the light shafts being shiftable to maintain said shaft in registration with the other shafts when there are variations in the length of the film, an actuating means responsive to variations in the length of the portion of the film between said points, said actuating means including a shiftable member engaging said portion of the film, and an operative connection between the member and the optical element, said connection including an adjustable connecting member adjustable to vary the ratio of movement of the member and element.

17. In a projector for projecting a series of pictures arranged longitudinally of a film having longitudinally spaced perforations, moving parts cooperating with perforations at two points spaced along the film, an optical system including means for projecting a plurality of shafts of light through the pictures of said series, and optical elements for directing the images of the shafts to fall in register on a screen, two of said elements for acting on spaced light shafts being pivotally mounted whereby they may be adjusted to maintain the registration of the images when there are variations in the length of the film, and a control for the optical system responsive to the variations in the length of the portion of the film between said two spaced points to simultaneously pivot the elements.

18. In a projector for projecting a series of pictures arranged longitudinally of a film having longitudinally spaced perforations, moving parts cooperating with perforations at two points spaced along the film, an optical system including means for projecting a plurality of shafts of light through the pictures of said series, and optical elements for directing the images of the shafts to fall in register on a screen, two of said elements for acting on spaced light shafts being pivotally mounted whereby they may be adjusted to maintain the registration of the images when there are variations in the length of the film, and a control for the optical system responsive to the variations in the length of the portion of the film operating between said two spaced points to simultaneously pivot the elements, the control including a shiftable member yieldingly urged against said portion of the film, a cam for pivoting the elements, and an operative connection between the member and cam.

19. In a projector for projecting a series of pictures arranged longitudinally of a photographic film, film-feeding means forming a moving loop in the film, an optical system including means for projecting a plurality of shafts of light through the pictures of said series, and optical elements for directing the images of the shafts to fall in register on a screen, means independently pivotally mounting two optical elements for acting on spaced light shafts whereby said elements may be adjusted to maintain the registration of the images when the film varies in length, two optical elements for acting on the same respective light shafts, means mounting the last-named elements for manual adjustment relative to the first-named elements, and means cooperating with said loop to be responsive to variations in its length and operable to adjust the first-named elements to compensate for said variations in the length of the film whereby said images are maintained in registration.

20. In a projector for handling film bearing spaced pictures, an adjustable optical system operable to project light through a plurality of pictures to fall on a screen in register, and means responsive to variations in the length of a portion of the film for adjusting the optical system, said means including a member operatively connected with the optical system engaging the face of the film to maintain a deviated portion in the film and movable in response to variations in the length of said portion to adjust the optical system to maintain the pictures in registration.

WALTER L. WRIGHT.